J. F. KINGSLEY.

DIE FOR MAKING EYE BARS.

No. 11,025. Reissued Aug. 20, 1889.

Witnesses

Walter P. Kemp.

F. L. Middleton

Inventor

John F. Kingsley.

By Ellis Spear

Attorney

N. PETERS, Photo-Lithographer, Washington, D. C.

UNITED STATES PATENT OFFICE.

JOHN F. KINGSLEY, OF ATHENS, PENNSYLVANIA.

DIE FOR MAKING EYE-BARS.

SPECIFICATION forming part of Reissued Letters Patent No. 11,025, dated August 20, 1889.

Original No. 369,014, dated August 30, 1887. Application for reissue filed May 23, 1889. Serial No. 311,895.

*To all whom it may concern:*

Be it known that I, JOHN F. KINGSLEY, a citizen of the United States, residing at Athens, in the county of Bradford and State of Pennsylvania, have invented certain new and useful Improvements in Dies and Connections for Making Eye-Bars; and I do hereby declare that the following is a full, clear, and exact description of the same, reference being had to the annexed drawings, making part of this specification, and to the letters and figures of reference marked thereon.

Figure 1:
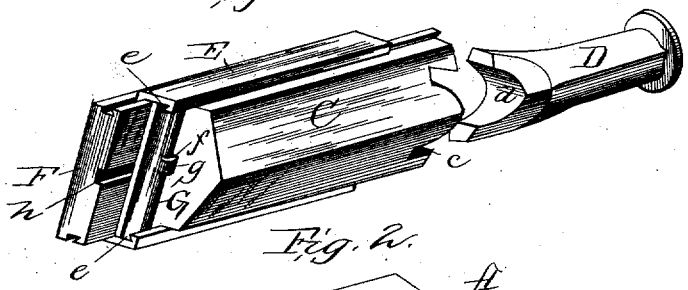
Figure 2:
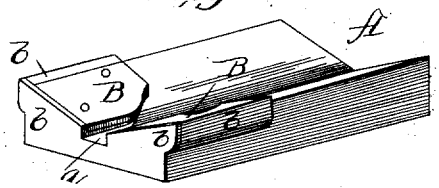
Figure 3:
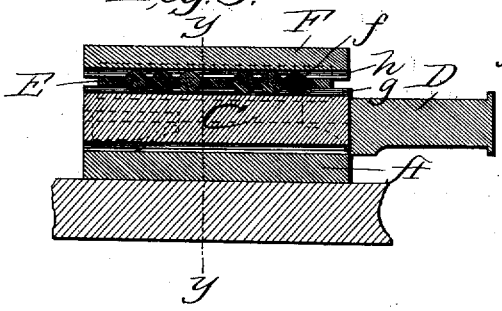
Figure 5:
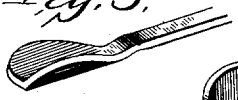
Figure 6:
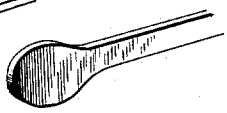

Figure 1 of the drawings is a perspective view of the upper die-section and its attachments; Fig. 2, a similar view of the lower die-section; Fig. 3, a longitudinal central section of Fig. 4, taken on line *x x;* Fig. 4, a transverse section taken on line *y y* of Fig. 3; Fig. 5, a perspective view, in detail, of so much of an eye-bar as is operated upon by my improved die; and Fig. 6, a similar view of a like portion of an eye-bar, the same being represented as finished and ready to be perforated.

The present invention has relation to dies for the manufacture of eye-bars, and is designed as an improvement on my former patent, dated February 15, 1887, No. 357,833, reissued April 30, 1889, No. 11,001; and the object thereof is to provide such a die with attachments that will materially facilitate the production of the eye-bar and enable them to be more perfectly and successfully formed.

Figure 4:
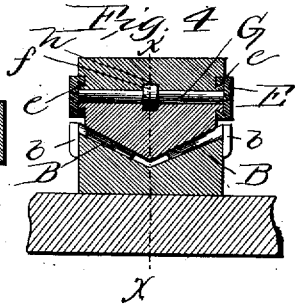

In the accompanying drawings, A represents the lower die-section, which is triangular in cross-section upon its upper side, where the eye of the bar is formed, but made flat at one end, or, in other words, formed with a recess, as shown at *a*, said die-section being supported by the base or bed of the machine, as shown in Figs. 3 and 4.

The die-section A is provided at its recessed end with seats, to which are detachably connected plates or forming projections B; or, in other words, the die-section is formed with flanges *b* at its sides and ends, against which abut the edges of the plates above referred to, to hold them in place, said plates having their inner edges so shaped as to conform to that portion of the head of the eye-bar desired or to the thickness thereof. The upper and movable die-section C upon its under side is triangular in cross-section, but of a sharper angle than the lower die-section A, so that when closed the space between the two enlarges from the center toward the side, as in my patent referred to. The end of the die C is cut away to form recesses *c* to receive the bifurcated end *d* of the rammer D. The rammer D upon its under side is of such shape as to fit the triangular shape of the lower die-section A, and the bifurcated end of the rammer, above described, is of such shape as to project below the level of the face of the die proper, so as to act upon the end of the bar to upset the same, and at the same time this projecting part of the rammer acts to give shape to the bar. This rammer is connected to the piston-rod of the machine.

Above the upper die-section C is a frame E, the inner sides thereof having dovetailed grooves *e*, to fit correspondingly-formed tongues upon the outer side of the die-section C, and a platen F, as more clearly shown in Fig. 4, said platen forming a part or being fastened to the die-closer of the machine, which closer is of such common construction and well known that it is not deemed necessary to show it in the drawings.

To the sides of the frame E are journaled the anti-friction rollers G, upon which bear the platen and upper die-section, said rollers having an enlarged bearing *f* midway of its end, which fits in grooves *g h* in the lower die-section and platen, respectively, thereby forming a guide for the two when moving longitudinally, and the dovetailed grooves in the roller-frame in connection with the correspondingly-formed tongues provide further means for guiding the lower die-section and platen to prevent them from lateral displacement. The enlarged portion of the anti-friction rollers, hereinbefore referred to, performs a further office, in that it keeps the upper die-section in a central position when it is raised or lowered.

In practice the end of the bar (as it comes from the rollers with parallel sides and edges) is heated and laid upon the lower die-section A between the plates B. The upper die-section C is now forced down upon it to bend the bar longitudinally to conform to the angular space between the inner faces of the die-sections or the space between the same, and the bar is held from receding, the end thereof bearing against the bifurcated end of the rammer D when in position, as shown in Fig. 3. Power is now applied to the rammer, causing the upper die-section to move longitudinally over the lower die-section, thereby forcing the end of the bar to assume the shape, as represented in Fig. 5, the rollers reducing the friction between the upper die-section and platen when they are being moved. This angular bending of the bar is for the purpose of keeping it straight during the process of upsetting. The enlarging space between the die-sections, by forming the upper one thereof at a sharper angle, as hereinbefore described, permits the metal to be more freely forced outward to form the head, and at the same time holding the center so that no metal will be forced from one side to the other.

By arranging the forming projections B on the lower die-section detachable and providing the upsetting projection on the removable rammer the parts which receive the most wear may be replaced when worn; but the principal advantage is, that different thicknesses and widths of bars may be upset, the rammer being practically automatically adjustable to form more or less of a projection according to the thickness of the bar, and the plates may be of any desired width and thickness.

I claim as my invention—

1. The combination, with an upper and lower die-section, one movable over the face of the other, of an upsetting projection or plunger detachably used in connection with the moving section, substantially as described.

2. The combination, with an upper and lower die-section, one movable over the face of the other, of forming projections detachably connected to one section, and an adjustable upsetting projection carried by the moving section, substantially as described.

3. The combination, with an upper and lower die-section, one movable over the face of the other, of detachably-connected forming projections on the face of one section, and a rammer detachably connected to the moving section, having an upsetting portion extending beyond the face of the die-section, substantially as described.

4. The combination, with an upper and lower die-section angular in cross-section, of forming projections on the face of the lower section and a rammer secured to the upper section having an upsetting portion projecting below the face of the die, substantially as described.

5. The combination, with a lower die-section triangular in cross-section, and an upper die-section, also triangular in section, and a platen arranged above it, of a frame provided with rollers and having dovetailed grooves upon its inner side to engage with similarly-formed tongues on the sides of the upper die-section and platen, substantially as and for the purpose set forth.

6. The combination, with a lower die-section and upper die-section and platen, having central grooves upon their inner sides, of the roller-frame and rollers having enlarged portions to fit in the grooves of the upper die-section and platen, substantially as and for the purpose set forth.

7. The combination, with the lower die-section and upper die-section having at one end recesses, as shown, of a rammer having a bifurcated end adapted to engage therewith, whereby said upper die-section is operated, substantially as and for the purpose specified.

In testimony whereof I have hereunto subscribed my name in the presence of two witnesses.

JOHN F. KINGSLEY.

Witnesses:
BENJAMIN MCAFEE,
S. A. HINES.